(12) United States Patent
Martinez

(10) Patent No.: US 6,202,544 B1
(45) Date of Patent: Mar. 20, 2001

(54) FLATBREAD MAKER WITH MOVABLE LOWER PLATE AND SLIDING ACTUATING ARM

(76) Inventor: Marvin G. Martinez, 1612 E. 17th St., Loveland, CO (US) 80538

( * ) Notice: Subject to any disclaimer, the term of this patent is extended or adjusted under 35 U.S.C. 154(b) by 0 days.

(21) Appl. No.: 09/630,842

(22) Filed: Aug. 2, 2000

(51) Int. Cl.[7] .............. A47J 37/00; A47J 37/06; A47J 37/08
(52) U.S. Cl. .............. 99/331; 99/333; 99/349; 99/353; 99/372; 99/379; 99/423; 219/521
(58) Field of Search .............. 99/326–333, 339, 99/340, 349, 353–355, 372–384, 422, 423, 427, 444–446, 449; 100/92, 93.1; 425/136, 151, 160, 298, 324.1, 343, 293, 317, 394, 412, 383, 398; 426/496, 512; 219/521, 524, 525, 443

(56) References Cited

U.S. PATENT DOCUMENTS

| | | | | |
|---|---|---|---|---|
| 3,880,064 | * | 4/1975 | Martinez | 99/349 |
| 4,011,431 | * | 3/1977 | Levin | 99/331 X |
| 4,487,116 | * | 12/1984 | Routhier | 99/339 |
| 4,664,025 | * | 5/1987 | Martinez | 99/331 |
| 4,838,153 | * | 6/1989 | Escamilla et al. | 99/349 X |
| 4,972,766 | * | 11/1990 | Anetsberger | 99/332 |
| 5,095,813 | * | 3/1992 | Escamilla et al. | 99/353 X |
| 5,197,377 | * | 3/1993 | Jennings et al. | 99/331 X |
| 5,341,727 | * | 8/1994 | Dickson | 99/427 X |
| 5,417,149 | * | 5/1995 | Raio et al. | 99/423 X |
| 5,473,976 | * | 12/1995 | Hermansson | 99/379 X |
| 5,802,958 | * | 9/1998 | Hermansson | 99/349 |
| 5,890,419 | * | 4/1999 | Moravec | 99/349 |

* cited by examiner

Primary Examiner—Timothy F. Simone
(74) Attorney, Agent, or Firm—Jensen & Puntigam, P.S.

(57) ABSTRACT

The flatbread maker includes a support structure which has a base portion, a short rear portion and an upper portion, wherein the upper portion angles upwardly as it extends forwardly from the rear portion, wherein the base portion includes a central track which extends inwardly from the front edge for receiving a roller element portion of an actuating arm. The actuating arm is generally L-shaped, having a roller element at the joining portion between vertical and lower leg portions thereof, the roller element being configured and arranged to slide along the track when the vertical leg portion of the arm is rotated downwardly, such that the roller element moves along the track and the free end of the lower leg moves upwardly, forcing a lower flatbread plate which is hinged to the rear portion of the support structure to rotate thereabout into a position adjacent an angled lower surface of the upper portion. This results in the pressing, heating and partial cooking of the flatbread.

13 Claims, 5 Drawing Sheets

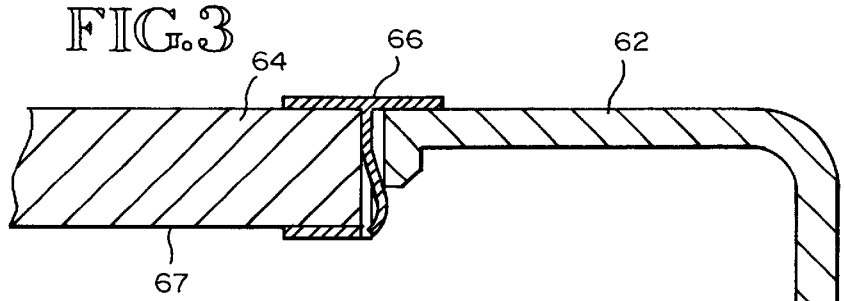
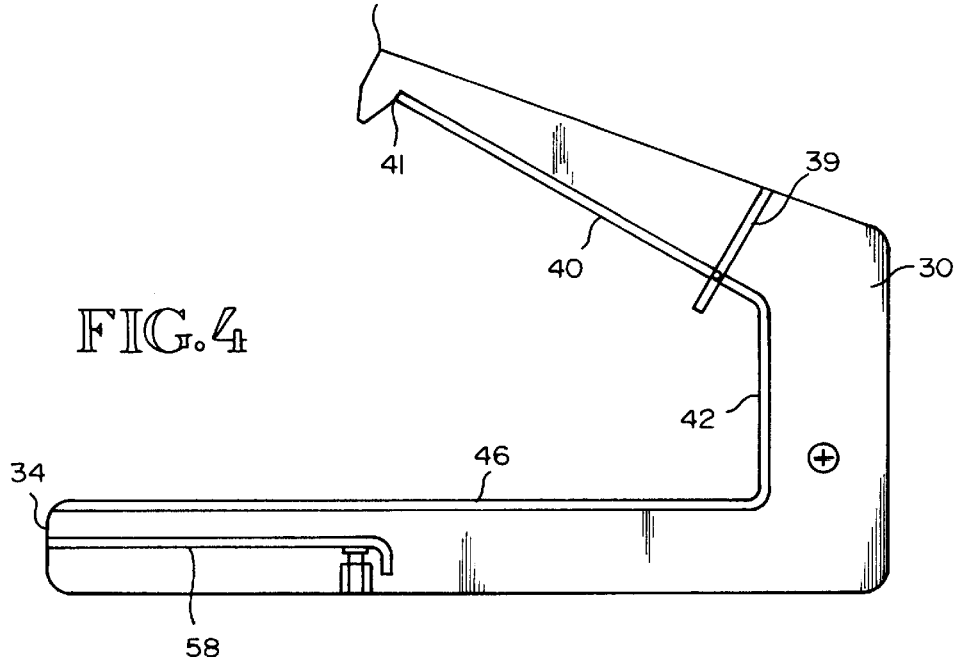
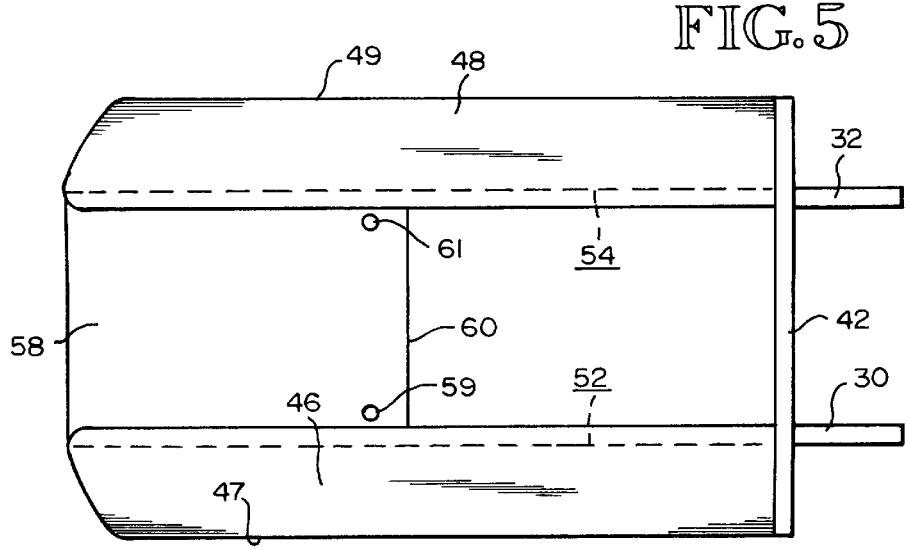

FLATBREAD MAKER WITH MOVABLE LOWER PLATE AND SLIDING ACTUATING ARM

TECHNICAL FIELD

This invention relates generally to flatbread makers, e.g. tortilla makers, and more particularly concerns such an apparatus which has a pressing action wherein a lower plate is rotated upwardly into contact with a fixed, angled upper plate.

BACKGROUND OF THE INVENTION

The increasing popularity of tortillas and other flatbreads, such as pita and lefsa, is well known. Many ethnic cultures have a distinctive flatbread, and an increasing food trend is for a variety of such flatbreads to be available to the general public instead of being limited to a particular ethnic group. One clear example of this trend is the tortilla, which is enjoyed across virtually the entire population of the United States as well as many other countries.

While flatbreads are available in ethnic restaurants and in some cases grocery stores, many specialized flatbreads are not readily available to the public. Many specialized flatbreads are usually available only at particular seasonal times and in some cases are only made at home using traditional recipes and traditional equipment, if any equipment is in fact used. Many of these flatbread products must in fact be made by hand and are labor-intensive.

Those flatbreads which are widely available, notably corn and flour tortillas and pita, suffer in quality to some extent by mass production and the natural decrease in freshness because of shelf time or the use of preservatives. There is a trade-off between the lower quality and taste of commercially available flatbreads and the inconvenience and time required to make superior flatbreads at home using traditional methods and equipment.

Machines have been designed to make fresh tortillas and, in some cases, other flatbreads, requiring relatively little effort or skill on the part of the user. The quality of flatbreads made by specialty machines is usually quite high. Some of these machines are strictly for commercial use, but others are intended for home use. Among these are the units described in U.S. Pat. No. 3,880,064 and U.S. Pat. No. 4,664,025.

Although these machines have to an extent been successful in rapidly producing high quality flatbreads, certain improvements are considered to be desirable. One possible area of improvement involves the action and structure for pressing the flatbread from a dough ball into the flattened product. Often, with existing machines, considerable force is necessary to produce the desired flatness of the product, and it is a challenge to design a portable home unit which is convenient for the user to operate, and yet is stable and safe. Generally, the less actual force required of the user on the pressing mechanism the better. The structure of the present invention is designed to provide a desired pressing force to properly flatten the dough ball with a minimum amount of force required of the user.

SUMMARY OF THE INVENTION

Accordingly, the present invention is a flatbread maker which comprises: a support structure having a base portion and an angled upper portion which joins with the base portion at a rear edge part thereof, wherein the base portion includes a track for receiving a roller element portion of an actuating arm, the track extending from a front edge of the base portion inwardly of the base portion a selected distance, approximately horizontally; a lower flatbread plate, hinged to the support structure at the rear thereof for rotation thereabout; an actuating arm having a generally L-shaped configuration, the arm having the roller element at a corner thereof, the roller element configured and arranged to slide along said track in the base portion of the support structure, wherein, when downward pressure is applied against a free end of the activating arm, the roller element moves along the track, such that the other end of the activating arm moves upwardly, forcing the lower flatbread plate to rotate into a position adjacent the angled surface of the upper portion, tending to flatten dough positioned therebetween into a flatbread portion of desired dimensions; and a heating element in at least one of (a) the lower flatbread plate and (b) the angled surface so as to heat and at least partially cook the flatbread portion.

BRIEF DESCRIPTION OF THE DRAWINGS

FIG. 3 is a cross-sectional view of a small portion of the structure of FIG. 2.

FIG. 4 is a side view showing a basic structural portion of the structure of FIGS. 2 and 3.

FIGS. 5, 6 and 7 are bottom, back and top elevational views of the structure of FIG. 4.

BEST MODE FOR CARRYING OUT THE INVENTION

Figure 1:
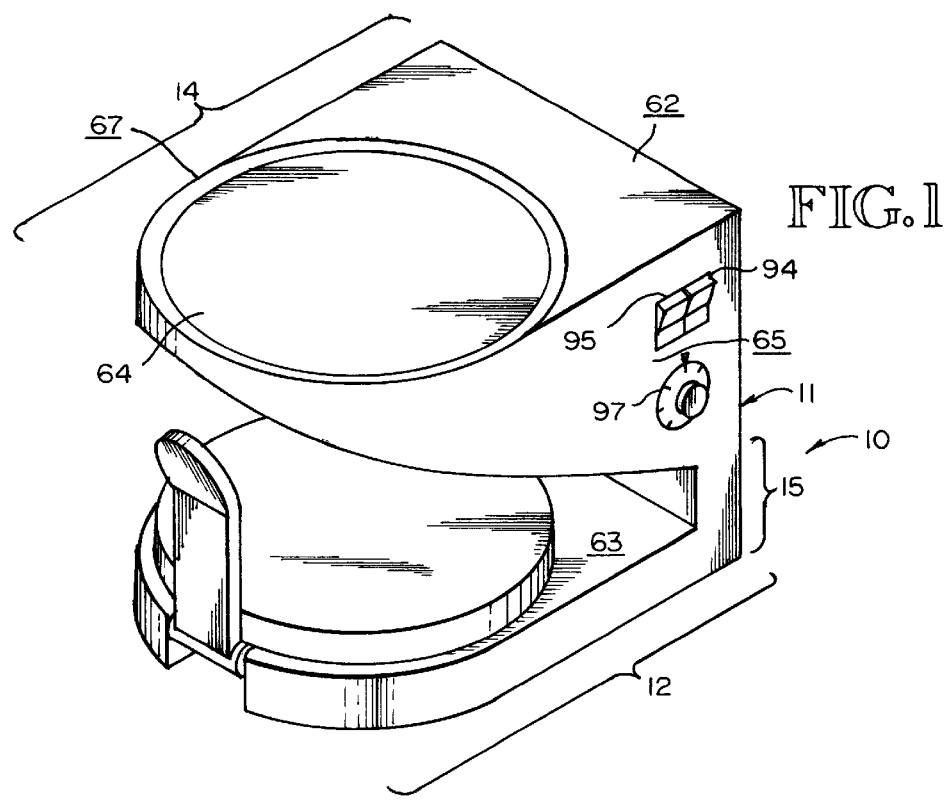
FIG. 1 is a perspective view of the flatbread maker of the present invention.

FIG. 1 shows an exterior perspective view of the flatbread maker of the present invention, shown generally at 10. It should be understood that the flatbread maker can have various external configurations. The basic structure of the apparatus, as opposed to its external configuration, is shown more clearly in FIGS. 2–7.

Referring to FIG. 1, flatbread maker 10 in general includes a housing 11, which in turn includes a base portion 12 and an upper portion 14, joined by a short rear section 15. Upper portion 14 extends forwardly, over base portion 12, such that there is a space between base portion 12 and upper portion 14. Upper portion 14 includes an inclined lower surface and a flat top surface. The inclined lower surface is at an angle of approximately 30° from the horizontal in the embodiment shown. This angle can be varied to some extent, i.e. within the range of 15–45°. In the embodiment shown, the exterior height of the apparatus is approximately 10–16 inches, with an exterior diameter of approximately 9–30 inches, to accommodate various sizes of tortillas.

Figure 2:
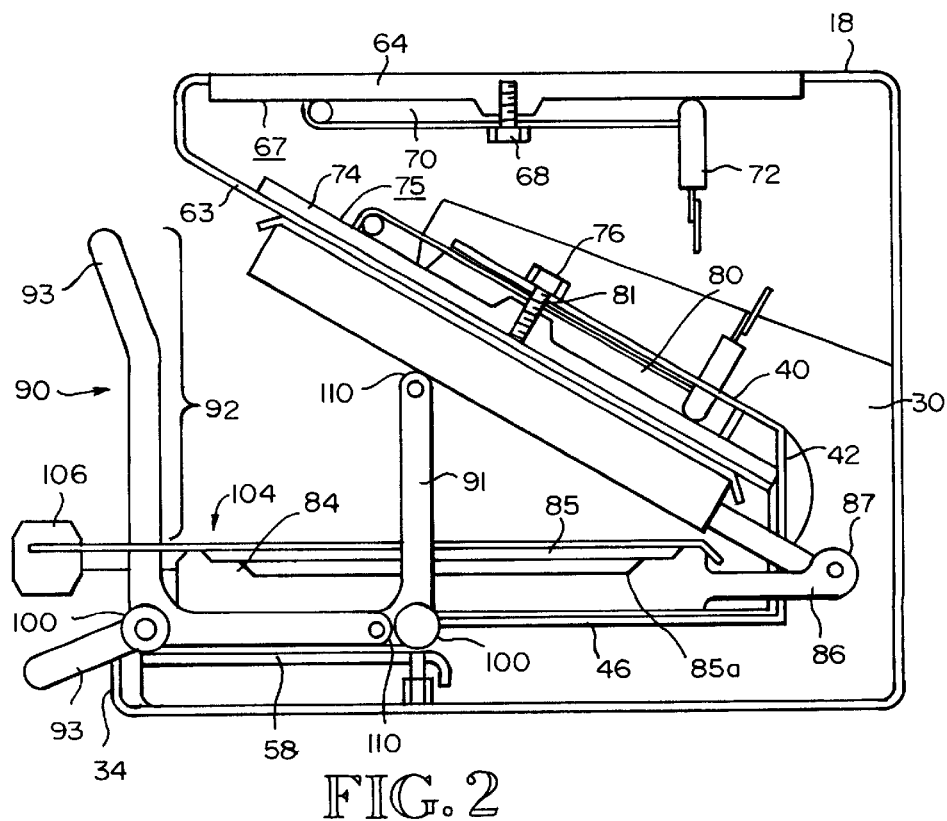
FIG. 2 is a cross-sectional view of the internal structure of the flatbread maker of FIG. 1, with the lower plate shown in a first, lowered position and a second, raised position.
Figure 6:
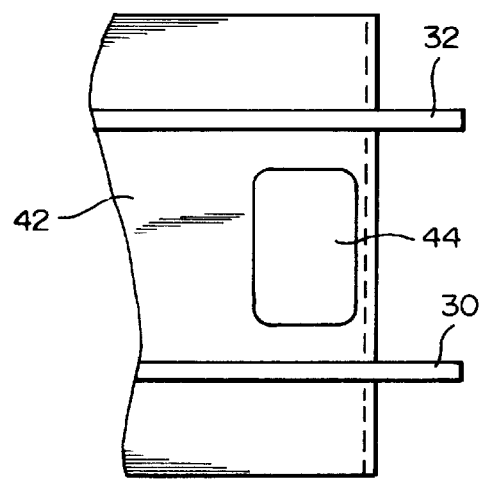
Figure 7:
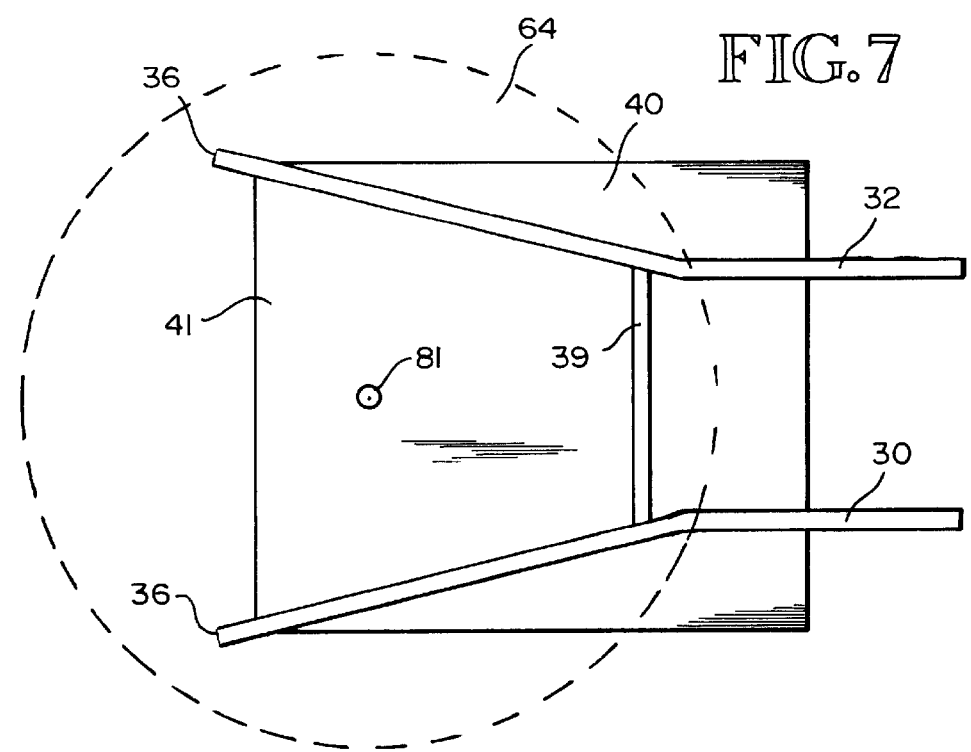

Within the housing of flatbread maker 10 is a support structure which is shown in FIGS. 2–7, with FIG. 2 including a cross-section of the housing shown in FIG. 1. Referring to FIG. 4, the support structure includes two spaced support rib portions 30, 32 which extend from a forward edge 34 of the base portion 12 of the apparatus to the rear portion, then extending vertically a short distance, defining the back of the support structure, and then forwardly and upwardly at an angle of 30° to an upper forward edge 36.

The ribs 30, 32 are approximately ¼-inch thick in the embodiment shown and are spaced approximately 3 inches apart except for a section in the upper portion of the apparatus, where the ribs flare outwardly to the forward edge 36 thereof, at which point the ribs are approximately six inches apart. A cross-brace 39 extends between the two ribs just beyond the point at which they begin to flare outwardly. In the embodiment shown, ribs 30, 32 are made of steel. In base portion 12 of the apparatus, the ribs are horizontal and approximately one inch high, while in the vertical and rear portions, they vary from 1½ inches high to approximately ½ inch at the forward edge 36.

Attached to the inner edges of the ribs 30, 32 from forward edge 34 of the base portion 12 to forward edge 36 of upper portion 14 of the apparatus is a continuous ⅛-inch thick steel support plate. In upper portion 14 of the apparatus, support plate portion 40 is approximately 7 inches long by 6 inches wide, positioned so that the forward edges of the two ribs extend just beyond forward edge 41 of plate portion 40. Attached to the inner edge of ribs 30, 32 in the vertical portion 15 of the apparatus is a support plate portion 42, which is a continuation of support plate portion 40, having the same width as plate portion 40. Support plate portion 42 has a rectangular opening 44 located between ribs 30 and 32 near the lower edge of support portion 42.

Attached to the upper edge of ribs 30 and 32 in the base portion 12 thereof, continuing from support plate portion 40, are two spaced support plate portions 46 and 48 (FIG. 5), each of which are approximately 1½ inches wide by approximately 10 inches long, with the forward edge of each support plate portion 46 and 48 being angled as shown. The outer side edges 47 and 49 of support plate portions 46 and 48 are a straight continuation of the side edges of support plate portions 42 and 40.

The combination of ribs 30, 32 and the continuous support plate portions 40, 42, 46 and 48 comprise what is referred to as the internal support structure of the apparatus.

Extending between the inner surfaces 52 and 54 of ribs 30, 32 from the forward edges thereof rearwardly a distance of approximately 4½ inches is a horizontal sheet 58, referred to as a track. The rear end 60 of track 58 curves downwardly and terminates a short distance above the lower edges of ribs 30 and 32. Track 58 is located approximately ½ inch below the upper edges of the ribs 30, 32. There are two openings 59, 61 in track 58 near the rearward end 60 and close to ribs 30, 32 to permit screws therethrough for attachment of the housing structure 11 thereto. Track 58 provides support for the movement of the handle portion of the flatbread maker, which is described in detail below.

FIGS. 1 and 2 show the arrangement of the housing relative to the internal support structure. Housing 11 extends adjacent and around the outer edges of support plate portions 40, 42, 46 and 48. The housing 11 forms the base surface of the flatbread maker, adjacent the lower edges of ribs 30, 32 in the base portion thereof, held in place by screws through openings 59 and 61 in track 58. The housing 11 also extends adjacent the rear edges of ribs 30, 32 in the rear portion thereof, continuing vertically to and forming a top surface 62 of the flatbread maker. Housing 11 also extends adjacent the outer surface of support plate portion 46, 40, 46 and then angles forwardly and upwardly, spaced a small distance from support plate portion 40 to the front edge of the top surface 62 of the flatbread maker. The housing also includes side surfaces 65 and 67, which are generally flat. Overall, the housing has the configuration shown in FIGS. 1 and 2.

The upper surface 62 of housing 11 includes a circular opening in which is positioned an upper surface griddle element 64. The upper surface griddle element 64 comprises a conventional metal cooking surface, approximately 9 inches in diameter and ⅜ inch thick. Griddle element 64 is secured to the upper surface 62 of the housing by a circular snap connector 66, as shown in cross-sectional detail in FIG. 3. Attached to the underside 67 of griddle element 64 by means of a screw 68 or the like is a first conventional circular heating element 70, with an electrical connection 72, as shown in FIG. 2.

Angled surface 63 of the housing also includes an opening in which is positioned a second griddle element 74, substantially the same in all respects as griddle element 64. Griddle element 74 is secured within the opening by a circular snap connector. Positioned against internal surface 75 of griddle element 74 is a second heating element 80. Both second heating element 80 and griddle element 74 are secured to each other and to support plate portion 40 by means of a screw 76, through an opening 81 in support plate portion 40. Hence, the inclined surface 63 is braced to the internal support structure (plate portion 40) by screw 76.

The flatbread maker 10 also includes a rotatable lower plate 84. Lower plate 84 is circular, approximately 8 inches in diameter and approximately 1 inch thick. A connecting hinge member 86 extends from a rear edge of plate 84 through opening 44 of the plate portion 42. Hinge member 86 is rotatably secured at an end part 87 to the vertical portion of the two ribs 30, 32. A bolt or rod (not shown) extends through an opening in end part 87, and is rigidly connected to the two spaced ribs. The hinge member 86 and hence the entire plate 84 rotates about the rod. In the upper surface of plate 84 is a third griddle element 85. A third heating element 85a is positioned against the lower surface of griddle element 85, held there by a screw or similar member (not shown).

Referring to FIG. 2, in a first or lower position, lower plate 84 is positioned horizontally against the support plate portions 46, 48. The action of a handle 90 rotates the lower plate 84 from its first, lower position to a second, raised portion.

Figure 8:
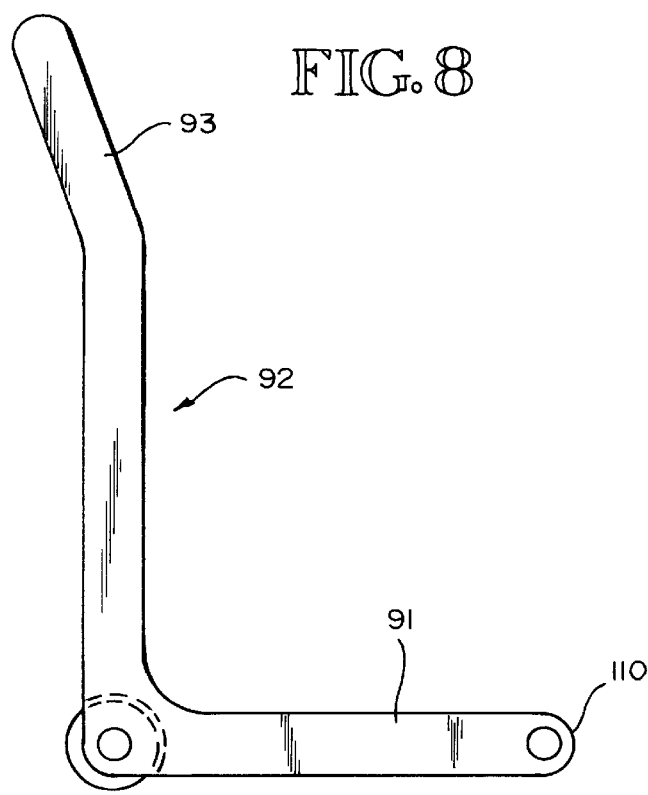
FIGS. 8 and 8A are side and rear elevational views of the handle portion of the flatbread maker of FIG. 1.
Figure 8A:
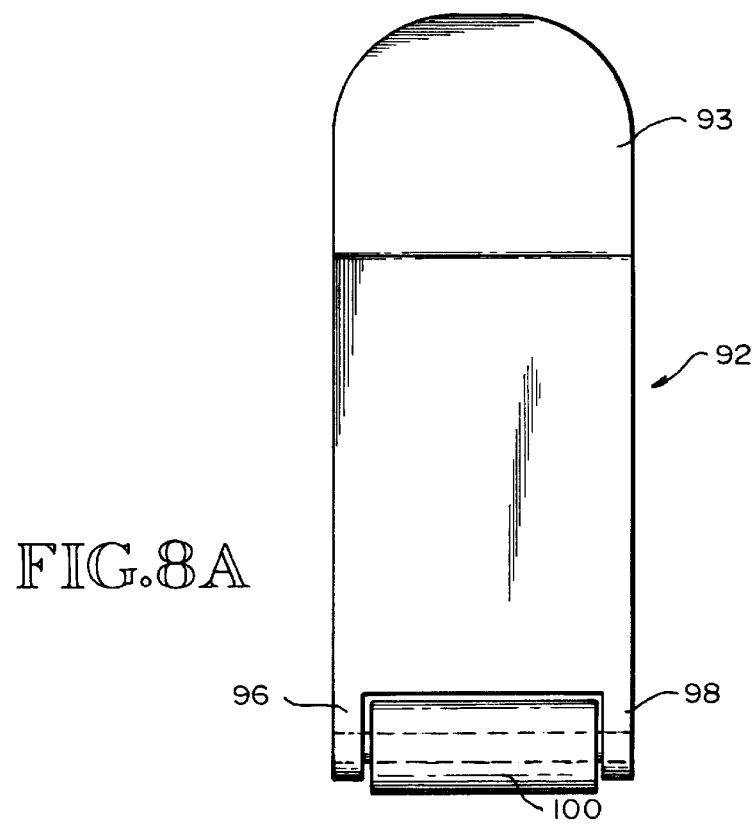

Handle 90 is shown in FIG. 2, but in more detail in FIGS. 8 and 8A. In the embodiment shown, it is generally L-shaped, having a base leg portion 91 and a vertical leg portion 92. The vertical leg portion 92 includes a section 93 at the free end thereof which angles slightly away from the remainder of the vertical leg portion. In the embodiment shown, the angle is approximately 15°, although this can be varied.

At the intersection of base leg portion 91 and vertical leg portion 92 is a cutout section (see FIG. 8A) which is bounded by two ears 96 and 98 at the edges of the handle. Rotatably mounted within the cutout section is a cylindrical roller element 100. Roller element 100 is free to rotate within the cutout section on a rod which extends through a longitudinal opening in the roller element and is connected to the two spaced ears. A portion of the peripheral surface of the roller element extends slightly beyond the outer surface of the vertical and base leg portions, such that the handle can be effectively rolled along a track or surface on the roller element without binding. In the embodiment shown, the free end 94 of the vertical leg section is slightly curved from side to side, as shown.

The handle 90 is positioned such that the roller element 100 is located on track 58 between support plate portions 46, 48 with the base leg portion 91 beneath lower plate 84. The track 58 supports the roller element and hence the entire handle. When the handle is oriented such that the vertical leg portion 92 is vertical and the base leg portion 91 is horizontal, the roller element is at the very forward edge 34 of the flatbread maker, as shown most clearly in FIG. 2. In this position, the base leg portion 91 extends nearly the entire length of track 58. When the handle 90 is in this position, the lower plate 84 is in its lower, horizontal position, again as shown most clearly in FIG. 2.

FIG. 2 also shows handle 90 in its fully rotated position. In order to rotate the lower plate 84 from its first or non-rotated position, angled section 93 of handle 90 is rotated downwardly and somewhat inwardly, in an arc, with an action such that roller element 100 moves inwardly along track 58, resulting in the free end 110 of the base leg portion 91 of the handle moving upwardly, which moves lower plate 84 about the connecting hinge member 86. Continued movement of the vertical leg portion of the handle in the downward arc results in the vertical leg portion becoming horizontal, laying along track 58, with angled portion 93 extending outwardly and downwardly from the forward edge 34 of the flatbread maker, as shown in FIG. 2.

In this fully rotated position of the handle, roller element 100 is now positioned at the inward end of track 58 and the base leg portion 91 is now vertical, resulting in lower plate 84 being rotated into a position adjacent the second griddle element 74. Griddle elements 95 and 74 are thus adjacent each other for the cooking of the flatbread dough ball therebetween. Griddle elements 74 and 85 could have a non-stick coating, as well as griddle element 64. This movement of handle 90, featuring a sliding action inwardly of the flatbread maker by virtue of the roller element 100 moving along track 58, with the base leg portion becoming vertical, as shown in FIG. 2, produces a significant force on the lower plate 84 against griddle element 74. This action occurs by the downward rotation of the upper leg portion of the handle. Sufficient mechanical advantage is gained by this structure that the user can readily and reliably produce a strong pressing force between lower plate 84 and the inclined surface 63.

Figure 9:
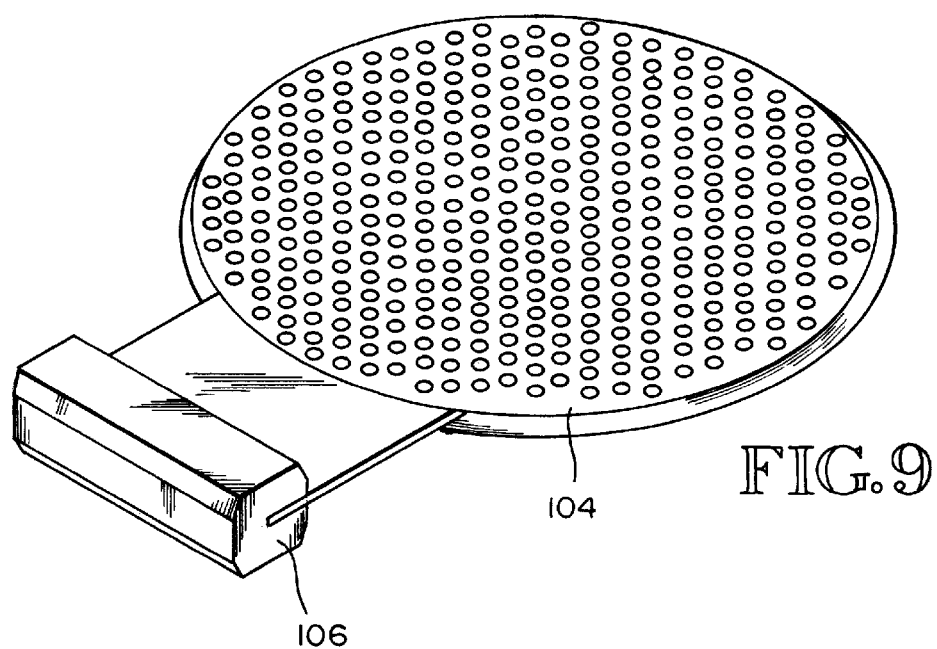
FIGS. 9 and 10 show two embodiments of a pan portion of the flatbread maker.
Figure 10:
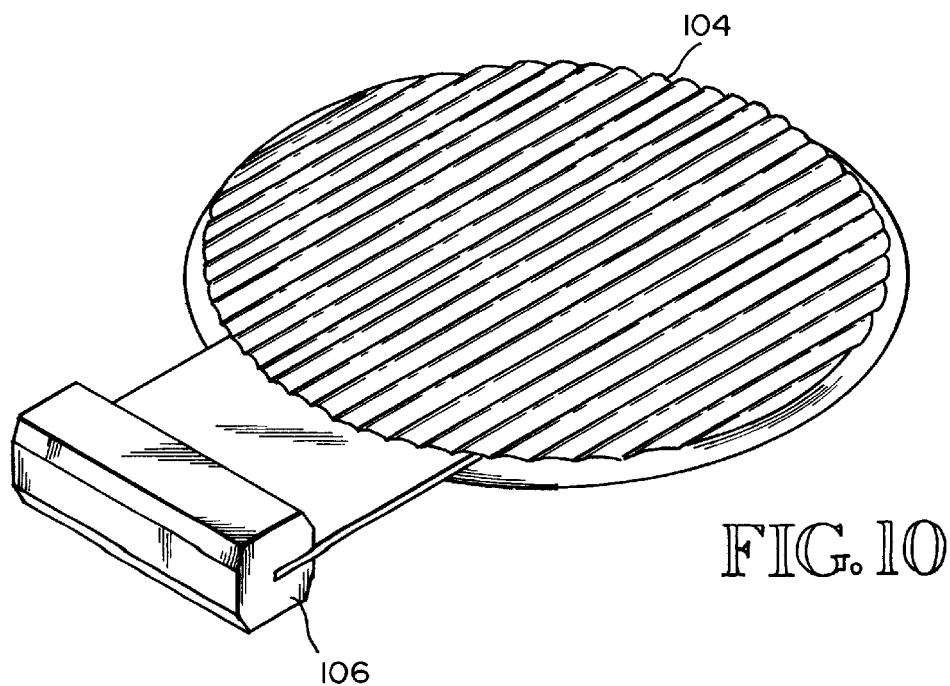

In use, a dough ball made from a recipe for the desired flatbread is placed on a circular, removable, thin pan element 104 (FIG. 2), which includes a handle 106. The pan element is positionable on top of lower plate 84 in the embodiment shown. Pan element 104 could be flat, or it could be textured, such as the mounded/dimpled embodiment of FIG. 9 or the corrugated/ridged embodiment of FIG. 10. The handle 90 is then actuated, moving the lower plate 84 upwardly adjacent second griddle element 74. This produces a flattening of the dough ball into the desired round configuration and desired thickness. The thickness can vary, depending upon the particular flatbread desired. The degree of movement of the handle can also be controlled so as to produce the desired thickness.

The second and third heating elements 80 and 85a have been previously actuated by switch 95, resulting in the preheating of their associated griddle elements, so that the flatbread is at least partially cooked, following lower plate 84, with griddle element 85 being brought to its raised position against griddle element 74. The handle 90 is left in the downward (lower plate is in its raised position) a sufficient time to produce the desired amount of cooking for the flatbread. The length of time will vary, depending upon the particular flatbread dough. The second and third heating elements 80 and 85a, which are controlled by switch 95 as well as thermostat 97, control the cooking of the flatbread. In the embodiment shown, the heating range of the thermostat is 150°–550° F.

When cooking is completed, handle 90 is moved back to its original position and the cooked or partially cooked flatbread is removed from the pan, by a spatula or the like. The flatbread may then be placed on the upper griddle element 64, which keeps the flatbread warm or continues to cook the flatbread, depending upon the selected temperature. Switch 99 controls the upper griddle element 64.

Hence, a new flatbread maker has been disclosed which incorporates a particular dough pressing structure, in particular, a structure for moving a lower plate adjacent a fixed, inclined surface. This arrangement produces reliable and convenient pressing of the flatbread. Heating elements positioned in the rotatable lower plate, the inclined surface and the upper surface of the flatbread maker produce the desired cooking of the flatbread.

The pressing structure includes a handle having a roller element at the juncture of its base and vertical leg portions. The roller element slides in a horizontal track instead of pivoting about a fixed point. This action results in a free end of the horizontal leg portion moving upwardly against a lower plate, rotating the plate against the inclined surface. Heated griddle elements, in both surfaces, produce the desired cooking of the dough ball.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A flatbread maker, comprising:
    a support structure having a base portion and an angled upper portion which joins with the base portion at a rear edge part thereof, wherein the base portion includes a track for receiving a roller element, the track extending from a front edge of the base portion inwardly of the base portion a selected distance;
    a lower flatbread plate, hinged to the support structure at the rear thereof for rotation thereabout;
    an actuating arm having a generally L-shaped configuration, the arm having a roller element at a corner thereof, the roller element configured and arranged to slide along said track in the base portion of the support structure, wherein, when downward pressure is applied against a free end of the actuating arm, the roller element moves along the track, such that the other end of the actuating arm moves upwardly, forcing the lower flatbread plate to rotate into a position adjacent the angled surface of the upper portion, tending to flatten dough positioned therebetween into a flatbread portion of desired dimensions; and
    a heating element in at least one of (a) the lower flatbread plate and (b) the angled surface so as to heat and at least partially cook the flatbread element.

2. An article of claim 1, including heating elements in both the lower flatbread plate and the angled surface.

3. An article of claim 1, wherein the actuating arm moves from a first position, in which a base leg portion of the arm is horizontal and positioned along said track into a second position, in which the base leg portion is substantially vertically oriented.

4. An article of claim 3, wherein a vertical leg portion of the L-shaped actuating arm includes two parts, a first part which extends a selected distance from a corner of the arm, wherein the base and vertical leg portions meet, and a second part which extends from the first part to a free end of the vertical leg portion, wherein the second part angles away from the first part at a small angle, and wherein the first part of the vertical leg portion is approximately the same length as the base leg portion.

5. An article of claim 2, wherein the apparatus includes a thermostat means for controlling the temperature of the two heating elements within a range of 150° F. to 550° F.

6. An article of claim 5, wherein the flatbread maker includes a horizontal top surface above the angled upper portion of the support structure, the top surface including a third heating element, with a temperature range of 150° F. to 550° F.

7. An article of claim 1, wherein the track extends inwardly from a front edge of the base portion of the apparatus a distance slightly greater than the length of a base leg portion of the actuating arm.

8. An article of claim 1, wherein the support structure includes two spaced bracing elements, the bracing elements extending from a lower front edge rearwardly to a rear edge thereof and then vertically for a short distance, and then forwardly, angling upwardly and slightly outwardly to an upper front edge.

9. An article of claim 8, wherein the upward angle is approximately 15–45°, and wherein the bracing elements are separated by approximately 3 inches, except for where they angle outwardly.

10. An article of claim 1, including a housing portion which extends around the support structure.

11. An article of claim 8, wherein the support structure includes a support plate attached to the inner edges of the two bracing elements, including an upper plate portion, a back plate portion and two spaced base plate portions, wherein the opposed side edges thereof are straight and parallel over the length of the support plate, and wherein the two spaced base plate portions are separated a distance slightly greater than the width of the arm.

12. An article of claim 1, including a removable pan element which sits on top of the lower flatbread plate.

13. An article of claim 12, wherein the upper surface of the pan element is textured to facilitate removal of the flatbread from the pan element after pressing and at least partial cooking has been completed.

* * * * *